United States Patent
Watanabe et al.

(10) Patent No.: US 12,397,683 B2
(45) Date of Patent: Aug. 26, 2025

(54) FUEL CELL VEHICLE AND PREDICTION METHOD

(71) Applicant: HONDA MOTOR CO., LTD., Tokyo (JP)

(72) Inventors: Takaharu Watanabe, Tokyo (JP); Kenta Suzuki, Tokyo (JP); Hideki Mochizuki, Tokyo (JP); Suguru Yamanaka, Tokyo (JP); Yuki Fukunishi, Tokyo (JP)

(73) Assignee: Honda Motor Co. Ltd., Tokyo (JP)

( * ) Notice: Subject to any disclaimer, the term of this patent is extended or adjusted under 35 U.S.C. 154(b) by 280 days.

(21) Appl. No.: 18/126,704

(22) Filed: Mar. 27, 2023

(65) Prior Publication Data
US 2023/0311710 A1    Oct. 5, 2023

(30) Foreign Application Priority Data
Mar. 29, 2022  (JP) .................. 2022-052680

(51) Int. Cl.
*B60L 58/30*    (2019.01)
*B60L 58/40*    (2019.01)
(Continued)

(52) U.S. Cl.
CPC .............. *B60L 58/30* (2019.02); *B60L 58/40* (2019.02); *H01M 8/04574* (2013.01);
(Continued)

(58) Field of Classification Search
CPC .......... B60L 2240/549; B60L 2250/16; B60L 2260/26; B60L 2260/52; B60L 2260/54;
(Continued)

(56) References Cited

U.S. PATENT DOCUMENTS 7,966,121 B2 *  6/2011  Aoyagi ............. H01M 8/04313
                                                        701/123
8,119,297 B2 *  2/2012  Kwon ................. H01M 16/006
                                                        429/429
(Continued)

FOREIGN PATENT DOCUMENTS

JP    2015-122901 A    7/2015
JP    2020-065365 A    4/2020
(Continued)

OTHER PUBLICATIONS

Office Action dated Apr. 2, 2024 issued in the corresponding Japanese Patent Application No. 2022-052680 with the English machine translation thereof.
(Continued)

*Primary Examiner* — Tyler J Lee
(74) *Attorney, Agent, or Firm* — Carrier, Shanda & Associates P.C.; Joseph P. Carrier; Fulchand P. Shende

(57) ABSTRACT

A fuel cell vehicle includes a first current amount calculating unit that calculates a first total amount of current output from a fuel cell during a period from a predetermined timing to the present time, a hydrogen amount calculating unit that calculates a hydrogen total amount output from a hydrogen tank during the period from the predetermined timing to the present time, a remaining amount acquisition unit that acquires a hydrogen remaining amount in the hydrogen tank, and a current amount prediction unit that predicts a current amount that can be supplied by the fuel cell based on the first total amount, the total amount, and the hydrogen remaining amount.

6 Claims, 3 Drawing Sheets

(51) Int. Cl.
H01M 8/04 (2016.01)
H01M 8/04537 (2016.01)

(52) U.S. Cl.
CPC ....... *B60L 2250/16* (2013.01); *B60L 2260/52* (2013.01); *B60L 2260/54* (2013.01)

(58) Field of Classification Search
CPC .......... B60L 58/13; B60L 58/30; B60L 58/40; H01M 8/04574
See application file for complete search history.

(56) References Cited

U.S. PATENT DOCUMENTS

| | | | | |
|---|---|---|---|---|
| 2007/0176762 A1* | 8/2007 | Aoyagi | ............. | H01M 8/04589 340/439 |
| 2010/0009219 A1* | 1/2010 | Kwon | ............... | H01M 8/04567 429/432 |
| 2019/0176640 A1* | 6/2019 | Lee | ........................ | B60K 35/26 |
| 2021/0188129 A1 | 6/2021 | Ichikawa | | |
| 2021/0229571 A1 | 7/2021 | Shimakami | | |
| 2023/0038076 A1* | 2/2023 | Lu | ............................ | B62J 43/16 |

FOREIGN PATENT DOCUMENTS

| | | |
|---|---|---|
| JP | 2021-100346 A | 7/2021 |
| JP | 2021-118658 A | 8/2021 |
| JP | 2022-048745 A | 3/2022 |

OTHER PUBLICATIONS

Office Action dated Nov. 7, 2023 issued in the corresponding Japanese Patent Application No. 2022-052680 with the English machine translation thereof.

* cited by examiner

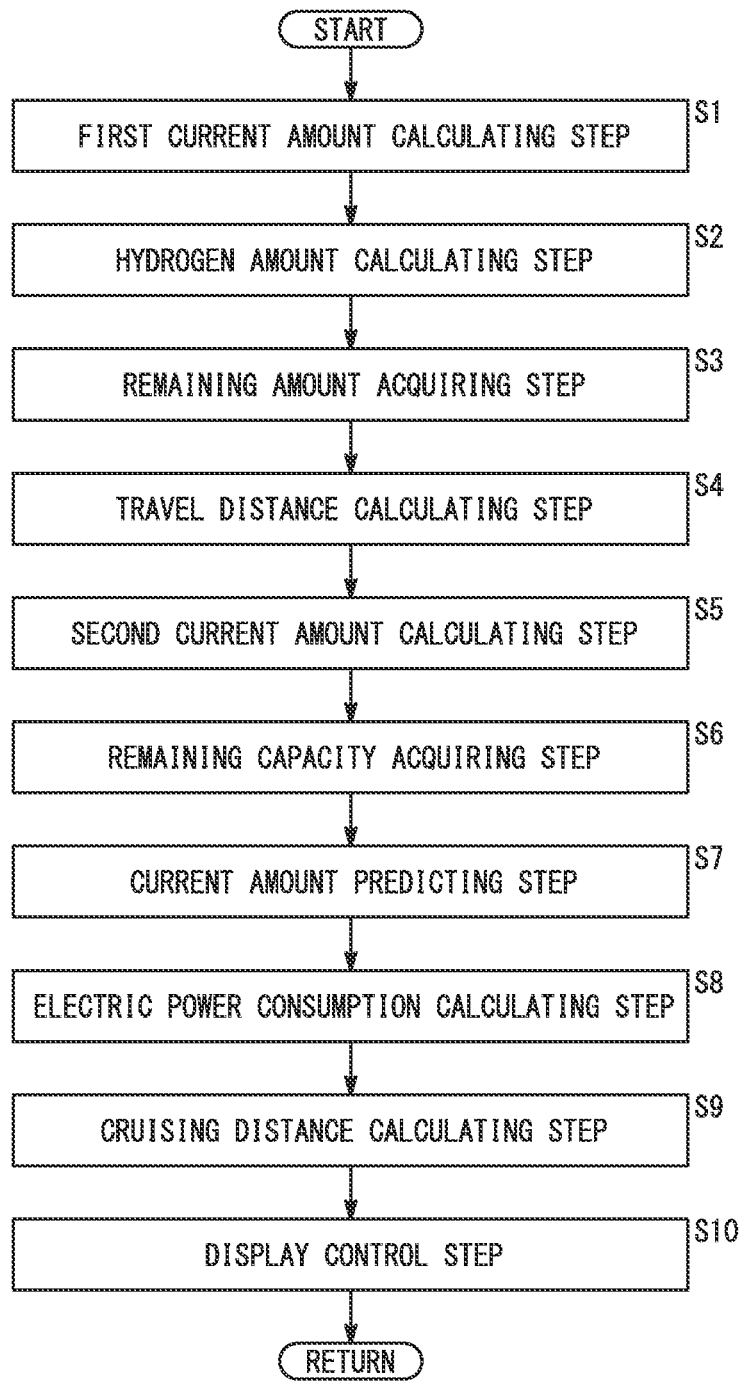

FUEL CELL VEHICLE AND PREDICTION METHOD

CROSS-REFERENCE TO RELATED APPLICATIONS

This application is based upon and claims the benefit of priority from Japanese Patent Application No. 2022-052680 filed on Mar. 29, 2022, the contents of which are incorporated herein by reference.

BACKGROUND OF THE INVENTION

Field of the Invention

The present invention relates to a fuel cell vehicle and a prediction method for predicting an amount of electric current that can be supplied by a fuel cell.

Description of the Related Art

In recent years, research and development have been conducted on fuel cells that contribute to energy efficiency in order to ensure that more people have access to affordable, reliable, sustainable and modern energy.

JP 2021-118658 A discloses a method for calculating a cruising distance of a fuel cell vehicle including a fuel cell. According to this method, the cruising distance of the fuel cell vehicle is calculated based on the fuel efficiency of the fuel cell vehicle.

SUMMARY OF THE INVENTION

In the technique related to the fuel cell, it may be difficult to accurately calculate the cruising distance based on the fuel consumption.

An object of the present invention is to solve the aforementioned problem.

According to a first aspect of the present invention, a fuel cell vehicle is equipped with a hydrogen tank configured to store hydrogen, a fuel cell configured to generate electric power using the hydrogen, and a drive source configured to be driven using electric power generated by the fuel cell, and the fuel cell vehicle includes a first current amount calculating unit configured to calculate a first total amount of output current that is output by the fuel cell during a period from a predetermined timing to present time, a hydrogen amount calculating unit configured to calculate a total amount of hydrogen that is output from the hydrogen tank to the fuel cell during the period from the predetermined timing to the present time, a remaining amount acquisition unit configured to acquire a remaining amount of hydrogen remaining in the hydrogen tank at the present time, and a current amount prediction unit configured to predict a current amount that is configured to be supplied by the fuel cell based on the first total amount of the output current, the total amount of hydrogen, and the remaining amount of hydrogen.

According to a second aspect of the invention, a prediction method predicts an amount of current that is configured to be supplied by a fuel cell of a fuel cell vehicle, the fuel cell vehicle including a hydrogen tank configured to store hydrogen, the fuel cell configured to generate electric power using the hydrogen, and a drive source configured to be driven using electric power generated by the fuel cell. The prediction method includes a first current amount calculating step of calculating a first total amount of output current that is output by the fuel cell during a period from a predetermined timing to present time, a hydrogen amount calculating step of calculating a total amount of hydrogen that is output from the hydrogen tank to the fuel cell during the period from the predetermined timing to the present time, a remaining amount acquiring step of acquiring a remaining amount of hydrogen remaining in the hydrogen tank at the present time, and a current amount predicting step of predicting a current amount that is configured to be supplied by the fuel cell based on the first total amount of the output current, the total amount of hydrogen, and the remaining amount of hydrogen.

According to the present invention, since it is possible to accurately predict the amount of current that the fuel cell of the fuel cell vehicle can supply to the drive source, it is possible to accurately calculate the cruising distance based on the amount of current.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a flowchart illustrating a flow of a prediction method according to the embodiment.

DETAILED DESCRIPTION OF THE INVENTION

Embodiment

Figure 1:
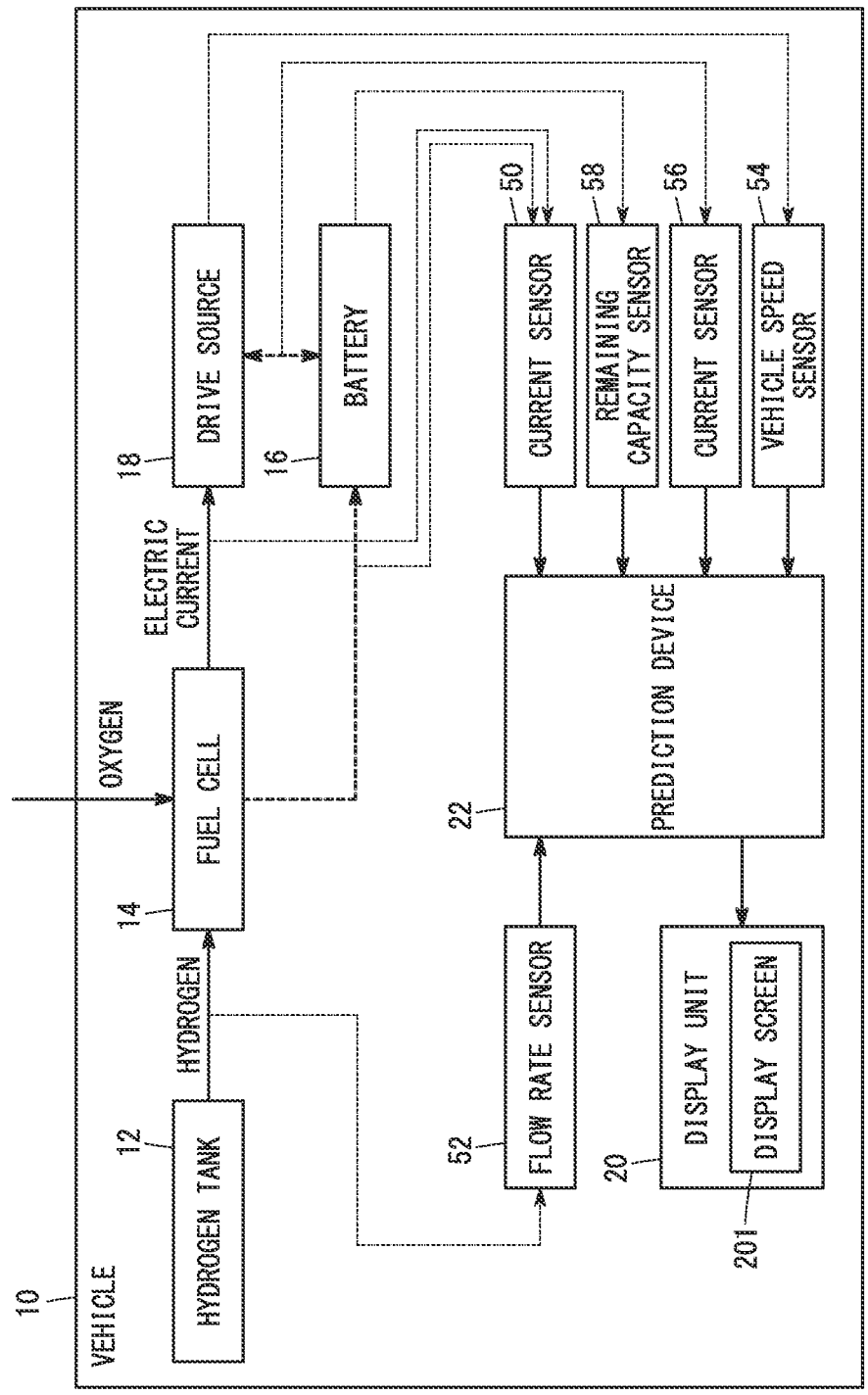
FIG. 1 is a configuration diagram of a vehicle according to an embodiment.

FIG. 1 is a configuration diagram of a vehicle 10 according to the embodiment.

The vehicle 10 is a fuel cell vehicle that includes a hydrogen tank 12, a fuel cell 14, a battery 16, a drive source 18, a display unit 20, and a prediction device 22.

The hydrogen tank 12 is a tank that stores hydrogen (hydrogen gas). The hydrogen stored in the hydrogen tank 12 is supplied to the fuel cell 14.

The fuel cell 14 is a power generation device that generates power using hydrogen supplied from the hydrogen tank 12. The fuel cell 14 generates electric power using a chemical reaction between the supplied hydrogen and oxygen. For example, air containing oxygen is supplied to the fuel cell 14. The fuel cell 14 outputs electric current by generating electric power. The output current of the fuel cell 14 is input to the drive source 18 or the battery 16.

The battery 16 is a secondary battery that stores electric power. The battery 16 is charged when a current is supplied thereto. The charged battery 16 can supply current to the drive source 18 as needed.

The drive source 18 is, for example, a rotating electric machine. The drive source 18 is driven using the supplied current. The drive source 18 is driven to rotate wheels of the vehicle 10 via, for example, a predetermined transmission mechanism. In accordance therewith, the vehicle 10 travels. That is, the vehicle 10 travels in accordance with driving of the drive source 18. The predetermined transmission mechanism includes, for example, a transmission. The wheels and the predetermined transmission mechanism are not shown in the accompanying drawings.

When the vehicle 10 is decelerated, the rotating electric machine included in the drive source 18 may generate electric power using rotational force (regenerative force) of the wheels. The current generated by the power generation of the rotating electric machine may be supplied to the battery 16.

The display unit 20 is, for example, a multi information display (MID). The display unit 20 includes a display screen 201 that appropriately displays various types of information. The display unit 20 may be a liquid crystal display, an organic EL display, or the like.

The vehicle 10 may further include an operating unit that is operated by a vehicle occupant to switch the type of information to be displayed on the display screen 201.

Figure 2:
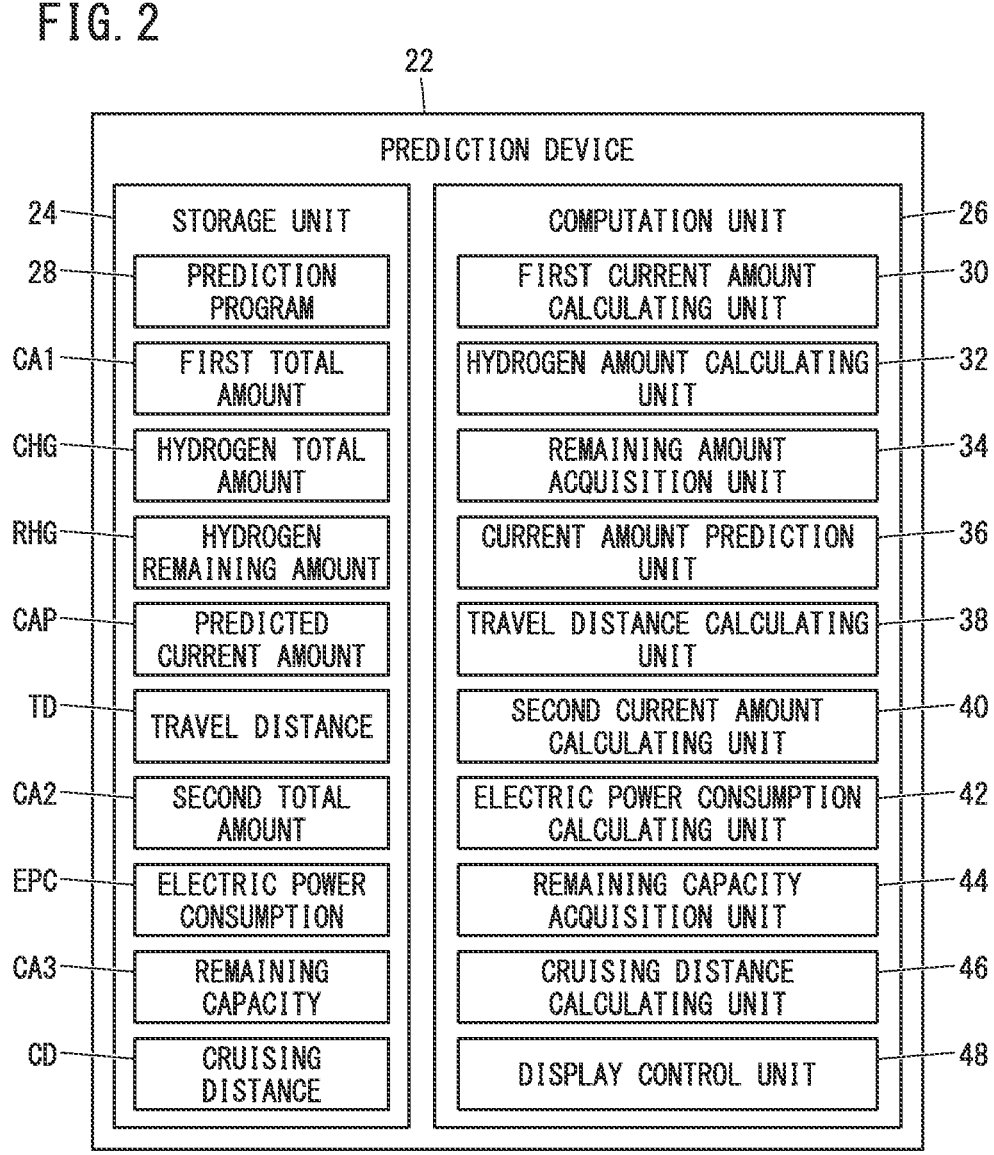
FIG. 2 is a configuration diagram of a prediction device.

FIG. 2 is a configuration diagram of the prediction device 22.

The prediction device 22 is a computer that predicts an integrated current amount that can be generated by the fuel cell 14. The prediction device 22 is included in, for example, an in-vehicle electronic control device (ECU). The prediction device 22 includes a storage unit 24 and a computation unit 26.

The storage unit 24 includes a storage circuit. The storage circuit includes, for example, one or more memories such as a random access memory (RAM) and a read only memory (ROM).

The storage unit 24 stores a prediction program 28. The prediction program 28 is a program for causing the prediction device 22 to implement the prediction method according to the present embodiment.

The data stored in the storage unit 24 is not limited to the prediction program 28. The storage unit 24 may store various types of data as necessary. Some of the various data stored in the storage unit 24 will be described later.

The computation unit 26 includes processing circuitry. The processing circuitry includes, for example, one or more processors. However, the processing circuitry of the computation unit 26 may include an integrated circuit such as an application specific integrated circuit (ASIC) or a field-programmable gate array (FPGA). The processing circuitry of the computation unit 26 may include a discrete device.

The computation unit 26 includes a first current amount calculating unit 30, a hydrogen amount calculating unit 32, a remaining amount acquisition unit 34, a current amount prediction unit 36, a travel distance calculating unit 38, a second current amount calculating unit 40, an electric power consumption calculating unit 42, a remaining capacity acquisition unit 44, a cruising distance calculating unit 46, and a display control unit 48.

The first current amount calculating unit 30, the hydrogen amount calculating unit 32, the remaining amount acquisition unit 34, the current amount prediction unit 36, and the travel distance calculating unit 38 are realized by the processor of the computation unit 26 executing the prediction program 28. Similarly, the second current amount calculating unit 40, the electric power consumption calculating unit 42, the remaining capacity acquisition unit 44, the possible distance calculating unit 46, and the display control unit 48 are realized by the processor of the computation unit 26 executing the prediction program 28. However, the integrated circuit, the discrete device, or the like described above may realize at least a part of the first current amount calculating unit 30, the hydrogen amount calculating unit 32, the remaining amount acquisition unit 34, the current amount prediction unit 36, and the travel distance calculating unit 38. The integrated circuit, the discrete device, or the like described above may realize at least a part of the second current amount calculating unit 40, the electric power consumption calculating unit 42, the remaining capacity acquisition unit 44, the cruising distance calculating unit 46, and the display control unit 48.

The first current amount calculating unit 30 calculates a total amount of output current that is output by the fuel cell 14 during a predetermined period. The total amount of the output current that is output by the fuel cell 14 during the predetermined period is also referred to as a first total amount CA1 in the following description. The calculated first total amount CA1 may be memorized in the storage unit 24.

The predetermined period is, for example, a period from a predetermined timing to the present time. The predetermined timing is, for example, the time when the vehicle 10 was started. However, the predetermined timing may be set to time while the vehicle 10 is traveling.

The first total amount CA1 is calculated based on, for example, a detection signal output by a current sensor 50 (see FIG. 1) in accordance with the output current that is output by the fuel cell 14. The first current amount calculating unit 30 calculates the first total amount CA1 by integrating the current detected by the current sensor 50.

The hydrogen amount calculating unit 32 calculates a total amount CHG of hydrogen (hydrogen total amount CHG) output from the hydrogen tank 12 to the fuel cell 14 during the predetermined period. The calculated hydrogen total amount CHG may be memorized in the storage unit 24.

The hydrogen total amount CHG is calculated based on, for example, a detection signal output by a flow rate sensor 52 (see FIG. 1) in accordance with the flow rate of hydrogen output from the hydrogen tank 12. The hydrogen amount calculating unit 32 calculates the hydrogen total amount CHG by integrating the flow rate detected by the flow rate sensor 52.

The hydrogen total amount CHG may be acquired using a pressure sensor that detects the gas pressure in the hydrogen tank 12. That is, when hydrogen is output from the hydrogen tank 12, the gas pressure in the hydrogen tank 12 changes. The flow rate of hydrogen can be calculated based on the amount of change in the gas pressure.

The remaining amount acquisition unit 34 acquires a remaining amount RHG of hydrogen (hydrogen remaining amount RHG) currently remaining in the hydrogen tank 12. The acquired hydrogen remaining amount RHG may be memorized in the storage unit 24.

The hydrogen remaining amount RHG can be acquired based on the detection signal of the flow rate sensor 52 or the pressure sensor, similarly to the hydrogen total amount CHG.

The current amount prediction unit 36 predicts the amount of current that can be supplied by the fuel cell 14 based on the first total amount CA1, the hydrogen total amount CHG, and the hydrogen remaining amount RHG. The current amount predicted by the current amount prediction unit 36 is also referred to as a predicted current amount CAP in the following description.

The predicted current amount CAP is a product of a quotient obtained by dividing the first total amount CA1 by the hydrogen total amount CHG and the hydrogen remaining amount RHG. The current amount prediction unit 36 predicts the predicted current amount CAP based on, for example, the following equation (1). In Equation (1), CAP indicates the predicted current amount CAP (unit: ampere hour). CA1 indicates the first total amount CA1 (unit: ampere hour) during the predetermined period. CHG indicates the hydrogen total amount CHG (unit: gram) during the predetermined period. RHG indicates the current hydrogen remaining amount RHG (unit: gram).

$$CAP = \frac{CA1}{CHG} \times RHG \qquad (1)$$

The calculated predicted current amount CAP may be stored in the storage unit 24.

According to the current amount prediction unit 36, the predicted current amount CAP is accurately predicted. The predicted current amount CAP can be used to calculate a cruising distance (distance to empty) CD of the vehicle 10, as described further below.

The travel distance calculating unit 38 calculates a travel distance TD. The travel distance TD is a distance by which the vehicle 10 has traveled during the predetermined period. The calculated travel distance TD may be memorized in the storage unit 24.

The travel distance calculating unit 38 calculates, for example, a product of a vehicle speed (velocity) and the predetermined period (time) as the travel distance TD. The vehicle speed is acquired based on, for example, a detection signal output by a vehicle speed sensor 54 (see FIG. 1) in response to the output of the drive source 18.

The second current amount calculating unit 40 calculates a total amount of output current that is output by the battery 16 during the predetermined period. The total amount of the current that is output by the battery 16 during the predetermined period is also referred to as a second total amount CA2 in the following description. The calculated second total amount CA2 may be memorized in the storage unit 24.

The output current of the battery 16 is acquired based on, for example, a detection signal that is output by a current sensor 56 (see FIG. 1) in accordance with the output current of the battery 16. The second current amount calculating unit 40 calculates the second total amount CA2 by integrating the current detected by the current sensor 56.

The electric power consumption calculating unit 42 calculates an electric power consumption EPC of the vehicle 10 based on the first total amount CA1, the second total amount CA2, and the travel distance TD.

The electric power consumption EPC is a quotient obtained by dividing the travel distance TD by the sum of the first total amount CA1 and the second total amount CA2. The electric power consumption calculating unit 42 calculates the electric power consumption EPC based on, for example, the following equation (2). In Equation (2), EPC indicates the electric power consumption EPC (unit: meter/ ampere hour). CA2 indicates the second total amount CA2 (unit: ampere hour). TD indicates the travel distance TD (unit: meter) of the vehicle 10 during the predetermined period.

$$EPC = \frac{TD}{CA1 + CA2} \qquad (2)$$

According to Equation (2), the electric power consumption EPC indicates the travel distance of the vehicle 10 per unit current amount. The calculated electric power consumption EPC may be memorized in the storage unit 24.

The remaining capacity acquisition unit 44 acquires the current remaining capacity CA3 of the battery 16. The remaining capacity CA3 is acquired based on, for example, a detection signal output by a remaining capacity sensor 58 (see FIG. 1) in accordance with the voltage and the current of the battery 16. The acquired remaining capacity CA3 may be memorized in the storage unit 24.

The cruising distance calculating unit 46 calculates the cruising distance CD of the vehicle 10 based on the predicted current amount CAP, the electric power consumption EPC, and the remaining capacity CA3. The cruising distance CD indicates a distance that the vehicle 10 can travel when both the fuel cell 14 and the battery 16 are used. The calculated cruising distance CD may be memorized in the storage unit 24.

The cruising distance CD is a sum of the product of the electric power consumption EPC and the remaining capacity CA3 and the product of the electric power consumption EPC and the predicted current amount CAP. Therefore, the cruising distance calculating unit 46 calculates the cruising distance CD based on, for example, the following equation (3). In Equation (3), CD indicates the cruising distance CD (unit: meter). CA3 indicates the current remaining capacity CA3 (unit: ampere hour) of the battery 16.

$$CD = EPC \times CA3 + EPC \times CAP \qquad (3)$$

According to Equation (3), the cruising distance CD is obtained based on the amount of current (the first total amount CA1 and the second total amount CA2) and the electric power consumption EPC. Therefore, according to the present embodiment, the cruising distance CD of the vehicle 10 can be calculated without calculating the fuel consumption of the vehicle 10.

Incidentally, there is a method of calculating the cruising distance CD of the vehicle 10 based on fuel consumption. That is, the fuel consumption is a travel distance of the vehicle 10 per unit weight of hydrogen. Conventionally, the cruising distance CD is calculated based on the product of the fuel consumption and the hydrogen remaining amount RHG in the hydrogen tank 12 (see also JP 2021-118658 A).

However, the fuel consumption changes while the vehicle 10 is traveling. For example, the above-described rotating electric machine generates electric power using regenerative power. Thus, the battery 16 is charged (referred to as Event 1). When the vehicle 10 travels using the charged battery 16, the power generation amount of the fuel cell 14 decreases. As a result, the fuel efficiency is improved (referred to as Event 2) after Event 1.

Here, a time difference between Events 1 and 2 causes a problem. In other words, there is a time difference between when the battery 16 is charged and when the power generation amount of the fuel cell 14 decreases. Therefore, at the stage of Event 1, it is impossible to calculate the cruising distance CD using the fuel consumption after Event 2. As a result, between Events 1 and 2, the cruising distance CD calculated based on the fuel consumption lacks accuracy.

In this regard, according to the present embodiment, respective changes in the first total amount CA1 of the fuel cell 14 and the remaining capacity CA3 can be quickly reflected in the cruising distance CD. Thus, the accuracy of the calculated cruising distance CD can be maintained.

The display control unit 48 controls the display unit 20 to display the cruising distance CD on the display screen 201. Thus, the vehicle occupant of the vehicle 10 can learn the cruising distance CD. In addition, the display control unit 48 may control the display unit 20 to further display the predicted current amount CAP, the electric power consumption EPC, and the like on the display screen 201.

The display control unit 48 may switch the display of the predicted current amount CAP, the electric power consumption EPC, and the like in accordance with an instruction from the vehicle occupant.

FIG. 3 is a flowchart illustrating a flow of a prediction method according to an embodiment.

The prediction device 22 is capable of performing the prediction method of FIG. 3. The prediction method of FIG. 3 includes a first current amount calculating step S1, a hydrogen amount calculating step S2, a remaining amount acquiring step S3, and a travel distance calculating step S4. The prediction method of FIG. 3 further includes a second current amount calculating step S5, a remaining capacity acquiring step S6, a current amount predicting step S7, an electric power consumption calculating step S8, a cruising distance calculating step S9, and a display control step S10.

However, the first current amount calculating step S1, the hydrogen amount calculating step S2, the remaining amount acquiring step S3, the travel distance calculating step S4, the second current amount calculating step S5, and the remaining capacity acquiring step S6 may be performed in any order.

In the first current amount calculating step S1, the first current amount calculating unit 30 calculates the first total amount CA1. The first current amount calculating unit 30 can calculate the first total amount CA1 based on the detection signal of the current sensor 50.

In the hydrogen amount calculating step S2, the hydrogen amount calculating unit 32 calculates the hydrogen total amount CHG. The hydrogen amount calculating unit 32 can calculate the hydrogen total amount CHG based on the detection signal of the flow rate sensor 52. However, a pressure sensor may be used instead of the flow rate sensor 52.

In the remaining amount acquiring step S3, the remaining amount acquisition unit 34 acquires the hydrogen remaining amount RHG. The remaining amount acquisition unit 34 can acquire the hydrogen remaining amount RHG based on the detection signal of the flow rate sensor 52 or the pressure sensor.

In the travel distance calculating step S4, the travel distance calculating unit 38 calculates the travel distance TD. The travel distance calculating unit 38 can acquire the travel distance TD based on the detection signal of the vehicle speed sensor 54.

In the second current amount calculating step S5, the second current amount calculating unit 40 calculates the second total amount CA2. The second current amount calculating unit 40 can calculate the second total amount CA2 based on the detection signal of the current sensor 56.

In the remaining capacity acquiring step S6, the remaining capacity acquisition unit 44 acquires the remaining capacity CA3. The remaining capacity acquisition unit 44 can acquire the remaining capacity CA3 based on the detection signal of the remaining capacity sensor 58.

In the current amount predicting step S7, the current amount prediction unit 36 predicts the predicted current amount CAP based on the execution results of the first current amount calculating step S1, the hydrogen amount calculating step S2, and the remaining amount acquiring step S3. The current amount prediction unit 36 can predict the predicted current amount CAP by using, for example, Equation (1) described above.

By executing the current amount predicting step S7, the amount of current that can be supplied by the fuel cell 14 is predicted.

The current amount predicting step S7 is executed after all of the first current amount calculating step S1, the hydrogen amount calculating step S2, and the remaining amount acquiring step S3 are completed. In other words, the current amount predicting step S7 may be started before the travel distance calculating step S4, the second current amount calculating step S5, and the remaining capacity acquiring step S6.

In the electric power consumption calculating step S8, the electric power consumption calculating unit 42 calculates the electric power consumption EPC based on the execution results of the first current amount calculating step S1, the travel distance calculating step S4, and the second current amount calculating step S5. The electric power consumption calculating unit 42 can calculate the electric power consumption EPC by using, for example, Equation (2) described above.

In the cruising distance calculating step S9, the cruising distance calculating unit 46 calculates the cruising distance CD based on the execution results of the remaining capacity acquiring step S6, the current amount predicting step S7, and the electric power consumption calculating step S8. The cruising distance calculating unit 46 can calculate the cruising distance CD using, for example, Equation (3) described above.

In the display control step S10, the display control unit 48 controls the display unit 20 to display the cruising distance CD calculated in the cruising distance calculating step S9 on the display screen 201.

When the display control step S10 is executed, the vehicle occupant in the vehicle 10 learns the cruising distance CD.

[Modifications]

Modifications of the above-described embodiment will be described below. However, description overlapping with the above embodiment will be omitted as much as possible in the following description. Constituent elements which have already been described in the above embodiment will be denoted with the same reference characters as those in the above embodiment unless otherwise indicated.

(Modification 1)

The vehicle 10 may further include a Fuel Cell Voltage Control Unit (FCVCU). The FCVCU includes, for example, a boost converter. The FCVCU is disposed between the fuel cell 14 and the rotating electric machine (inverter). The FCVCU adjusts the first current (voltage) and outputs the first current (voltage) to the drive source 18. However, the first current adjusted by the FCVCU may be output to the battery 16.

In the vehicle 10 including the FCVCU, the first current amount calculating unit 30 may calculate the total amount of the first current after being adjusted by the FCVCU as the first total amount CA1. Therefore, the current sensor 50 may detect the current output from the FCVCU.

(Modification 2)

Based on the electric power consumption EPC and the predicted current amount CAP, the cruising distance calculating unit 46 may calculate a cruising distance CD (CD2) that the vehicle 10 can travel without supplying the remaining capacity CA3 of the battery 16 to the rotating electric machine.

By substituting 0 for CA3 in Equation (3), following Equation (4) for calculating the cruising distance CD2 is acquired. In Equation (4), CD2 indicates the cruising distance CD2. The other characters conform to Equation (3).

$$CD2 = CAP \times EPC \qquad (4)$$

The display control unit 48 may control the display unit to display the cruising distance CD2 on the display screen 201.

(Modification 3)

In relation to Modification 2, the vehicle 10 need not necessarily include the battery 16. In this case, the second current amount calculating unit 40, the current sensor 56, the remaining capacity acquisition unit 44, and the remaining capacity sensor 58 are omitted from the configuration of the vehicle 10.

In addition, in the case of the present modification example, the method of calculating the electric power consumption EPC is different from that of the embodiment. Specifically, the electric power consumption EPC according to the present modification is a quotient obtained by dividing the travel distance TD by the first total amount CA1. Therefore, the electric power consumption calculating unit 42 according to the present modification calculates the electric power consumption EPC based on following Equation (5). In Equation (5), EPC2 indicates the electric power consumption EPC according to the present modification.

$$EPC2 = \frac{TD}{CA1} \quad (5)$$

(Modification 4)

Based on the electric power consumption EPC and the remaining capacity CA3 of the battery 16, the cruising distance calculating unit 46 may calculate a cruising distance CD (CD3) that the vehicle 10 can travel without power generation by the fuel cell 14. For example, when the vehicle 10 travels in an EV mode, the vehicle 10 travels based on the remaining capacity CA3, without power generation of the fuel cell 14.

By substituting 0 for CAP in Equation (3), following Equation (6) for calculating the cruising distance CD3 is acquired. In Equation (6), CD3 indicates the cruising distance CD3.

$$CD3 = CA3 \times EPC \quad (6)$$

The display control unit 48 may control the display unit 20 to display the cruising distance CD3 on the display screen 201.

(Combination of Plural Modifications)

The plurality of modifications described above may be appropriately combined as long as there is no contradiction in the combination.

Invention Obtained from Embodiment

Hereinafter, invention that can be grasped from the above-described embodiment and modifications will be described.
<First Aspect of Invention>

According to a first aspect of the invention, the fuel cell vehicle (10) is equipped with the hydrogen tank (12) configured to store hydrogen, the fuel cell (14) configured to generate electric power using the hydrogen, and the drive source (18) configured to be driven using electric power generated by the fuel cell. The fuel cell vehicle includes the first current amount calculating unit (30) configured to calculate the first total amount (CA1) of output current that is output by the fuel cell during the period from the predetermined timing to the present time, the hydrogen amount calculating unit (32) configured to calculate the total amount (CHG) of hydrogen (hydrogen total amount) that is output from the hydrogen tank to the fuel cell during the period from the predetermined timing to the present time, the remaining amount acquisition unit (34) configured to acquire the remaining amount (RHG) of hydrogen (hydrogen remaining amount) remaining in the hydrogen tank at the present time, and the current amount prediction unit (36) configured to predict the current amount (CAP) that is configured to be supplied by the fuel cell based on the first total amount of the output current, the total amount of hydrogen, and the remaining amount of hydrogen.

Consequently, it is possible to accurately predict the amount of current that can be supplied to the drive source by the fuel cell of the fuel cell vehicle.

The first aspect of the invention may further include the travel distance calculating unit (38) configured to calculate the travel distance (TD) that the fuel cell vehicle has traveled from the predetermined timing to the present time, and the electric power consumption calculating unit (42) configured to calculate the electric power consumption (EPC) of the fuel cell vehicle based on the first total amount of the output current and the travel distance. Consequently, the electric power consumption reflecting the output current amount of the fuel cell is calculated.

The first aspect of the invention may further include the battery (16) configured to supply electric power to the drive source, and the second current amount calculating unit (40) configured to calculate the second total amount (CA2) of the output current that is output by the battery during the period from the predetermined timing to the present time, wherein the electric power consumption calculating unit calculates the electric power consumption of the fuel cell vehicle based on the first total amount of the output current, the travel distance, and the second total amount. Consequently, the electric power consumption reflecting both the output current amount of the fuel cell and the output current amount of the battery is calculated.

The first aspect of the fuel cell vehicle may further include the cruising distance calculating unit (46) configured to calculate the cruising distance (CD2) that the fuel cell vehicle is configured to travel only by the fuel cell, based on the electric power consumption of the fuel cell vehicle and the current amount predicted by the current amount prediction unit. Consequently, the cruising distance can be accurately predicted.

The first aspect of the present invention may further include the remaining capacity acquisition unit (44) configured to acquire the remaining capacity (CA3) of the battery, and the cruising distance calculating unit (46) configured to calculate the cruising distance (CD3) that the fuel cell vehicle is configured to travel only by the battery, based on the electric power consumption of the fuel cell vehicle and the remaining capacity of the battery. Consequently, the cruising distance can be accurately predicted.

The cruising distance calculating unit may calculate the cruising distance (CD) that the fuel cell vehicle is configured to traveling by the battery and the fuel cell, based on the electric power consumption of the fuel cell vehicle, the current amount predicted by the current amount prediction unit, and the remaining capacity of the battery. Consequently, it is possible to accurately predict the cruising distance when the fuel cell vehicle travels in the EV mode, for example.

The first aspect may further include the display unit (20) configured to display the cruising distance. Consequently, the vehicle occupant of the fuel cell vehicle learns the cruising distance.

<Second Aspect of Invention>

According to a second aspect of the invention, the computer predicts the amount of current that is configured to be supplied by the fuel cell (14) of the fuel cell vehicle (10) by the prediction method. The fuel cell vehicle including the hydrogen tank (12) configured to store hydrogen, the fuel cell configured to generate electric power using the hydrogen, and the drive source (18) configured to be driven using electric power generated by the fuel cell. The prediction method includes the first current amount calculating step (S1) of calculating the first total amount (CA1) of output current that is output by the fuel cell during the period from the predetermined timing to the present time, the hydrogen amount calculating step (S2) of calculating the total amount (CHG) of hydrogen (hydrogen total amount) that is output from the hydrogen tank to the fuel cell during the period from the predetermined timing to the present time, the remaining amount acquiring step (S3) of acquiring the remaining amount (RHG) of hydrogen (hydrogen remaining amount) remaining in the hydrogen tank at the present time, and the current amount predicting step (S7) of predicting the current amount (CAP) that is configured to be supplied by the fuel cell based on the first total amount of the output current, the total amount of hydrogen, and the remaining amount of hydrogen.

Consequently, it is possible to accurately predict the amount of current that can be supplied to the drive source by the fuel cell of the fuel cell vehicle.

The present invention is not limited to the above disclosure, and various modifications are possible without departing from the essence and gist of the present invention.

The invention claimed is:

1. A fuel cell vehicle that includes a hydrogen tank configured to store hydrogen, a fuel cell configured to generate electric power using the hydrogen, a battery, and a drive source configured to be driven using the electric power generated by the fuel cell or supplied from the battery, the fuel cell vehicle comprising one or more processors that execute computer-executable instructions stored in a memory, wherein the one or more processors execute the computer-executable instructions to cause the fuel cell vehicle to:

calculate a first total amount of output current that is output by the fuel cell during a period from a predetermined timing to present time;

calculate a total amount of hydrogen that is output from the hydrogen tank to the fuel cell during the period from the predetermined timing to the present time;

acquire a remaining amount of hydrogen remaining in the hydrogen tank at the present time;

predict, as a predicted current amount, a current amount that is configured to be supplied by the fuel cell based on the first total amount of the output current, the total amount of hydrogen, and the remaining amount of hydrogen;

calculate a total travel distance that the fuel cell vehicle has traveled during the period from the predetermined timing to the present time;

calculate an electric power consumption of the fuel cell vehicle based on the first total amount of the output current and the total travel distance, the electric power consumption indicating a travel distance of the fuel cell vehicle per total amount of current supplied to the drive source;

acquire a remaining capacity of the battery; and calculate a cruising distance that the fuel cell vehicle is configured to travel, based on the predicted current amount, the electric power consumption of the fuel cell vehicle, and the remaining capacity of the battery, wherein the one or more processors cause the fuel cell vehicle to calculate the cruising distance as a first cruising distance that the fuel cell vehicle is configured to travel by the current supplied to the drive source only from the fuel cell, based on the predicted current amount and the electric power consumption of the fuel cell vehicle.

2. The fuel cell vehicle according to claim 1, wherein the one or more processors cause the fuel cell vehicle to:

calculate a second total amount of output current that is output by the battery during the period from the predetermined timing to the present time, and calculate the electric power consumption of the fuel cell vehicle based on the first total amount of the output current, the total travel distance, and the second total amount.

3. The fuel cell vehicle according to claim 1, wherein the one or more processors cause the fuel cell vehicle to:

calculate the cruising distance as a second cruising distance that the fuel cell vehicle is configured to travel only by the battery, based on the electric power consumption of the fuel cell vehicle and the remaining capacity of the battery.

4. The fuel cell vehicle according to claim 1, wherein the one or more processors cause the fuel cell vehicle to calculate a the cruising distance as a third cruising distance that the fuel cell vehicle is configured to travel by the battery and the fuel cell, based on the electric power consumption of the fuel cell vehicle, the predicted current amount, and the remaining capacity of the battery.

5. The fuel cell vehicle according to claim 1, wherein the one or more processors cause the fuel cell vehicle to display the cruising distance.

6. A prediction method for predicting an amount of current that is configured to be supplied by a fuel cell of a fuel cell vehicle, the fuel cell vehicle including a hydrogen tank configured to store hydrogen, a battery, and a drive source configured to be driven using the electric power generated by the fuel cell or supplied from the battery, the prediction method comprising:

calculating a first total amount of output current that is output by the fuel cell during a period from a predetermined timing to present time;

calculating a total amount of hydrogen that is output from the hydrogen tank to the fuel cell during the period from the predetermined timing to the present time;

acquiring a remaining amount of hydrogen remaining in the hydrogen tank at the present time; and predicting, as a predicted current amount, a current amount that is configured to be supplied by the fuel cell based on the first total amount of the output current, the total amount of hydrogen, and the remaining amount of hydrogen;

calculating a total travel distance that the fuel cell vehicle has traveled during the period from the predetermined timing to the present time;

calculating an electric power consumption of the fuel cell vehicle based on the first total amount of the output current and the total travel distance, the electric power consumption indicating a travel distance of the fuel cell vehicle per total amount of current supplied to the drive source;

acquiring a remaining capacity of the battery; and
calculating a cruising distance that the fuel cell vehicle is configured to travel, based on the predicted current amount, the electric power consumption of the fuel cell vehicle, and the remaining capacity of the battery,
wherein in calculating the cruising distance, the cruising distance is calculated as a first cruising distance that the fuel cell vehicle is configured to travel by the current supplied to the drive source only from the fuel cell, based on the predicted current amount and the electric power consumption of the fuel cell vehicle.

* * * * *